USO05166800A

United States Patent [19]
Mori et al.

[11] Patent Number: 5,166,800
[45] Date of Patent: Nov. 24, 1992

[54] SOLID-STATE IMAGING DEVICE HAVING A WIDENED DYNAMIC RANGE

[75] Inventors: Takeshi Mori, Tokyo; Tatsuo Nagasaki, Yokohama, both of Japan

[73] Assignee: Olympus Optical Co., Ltd., Tokyo, Japan

[21] Appl. No.: 671,521

[22] Filed: Mar. 19, 1991

[30] Foreign Application Priority Data

Mar. 26, 1990 [JP] Japan ................................. 2-75842
Apr. 21, 1990 [JP] Japan ................................. 2-105902

[51] Int. Cl.⁵ ...................... H04N 3/14; H04N 5/335
[52] U.S. Cl. ........................ 358/213.27; 358/213.19; 358/213.26
[58] Field of Search ................ 358/213.27, 213.19, 358/213.15, 213.31, 213.26

[56] References Cited

U.S. PATENT DOCUMENTS 4,788,592 11/1988 Yamawaki et al. ............ 358/213.15
4,926,247 5/1990 Nagasaki et al. .
4,974,093 11/1990 Murayama et al. ............ 358/213.15

FOREIGN PATENT DOCUMENTS 62-157479 7/1987 Japan .
64-61177 3/1989 Japan .
2-50584 2/1990 Japan .
2-134991 5/1990 Japan .

Primary Examiner—Michael Razavi
Assistant Examiner—Wendy R. Greening
Attorney, Agent, or Firm—Frishauf, Holtz, Goodman & Woodward

[57] ABSTRACT

A solid-state imaging device has a plurality of photoelectric conversion elements, a plurality of first vertical shift registers, a plurality of slice circuits, a plurality of second vertical shift registers, a plurality of charge cumulating media, a read circuit, and a horizontal shift register. The photoelectric conversion elements are arranged in a matrix, and generate charges in accordance with an irradiated light amount. The first vertical shift registers are coupled to the photoelectric conversion elements, and transfer the charges read from the photoelectric conversion elements. The slice circuits are connected to output terminals of the first vertical shift registers, cut excessive charges exceeding a preset slice level from the charges input from the first vertical shift registers, and output effective charges. The second vertical shift registers are connected to output terminals of the slice circuits, have charge storage sections corresponding in number to the photoelectric conversion elements connected to the first vertical shift registers, and transfer the charges output from the slice circuits. The charge adding media are coupled to the charge storage section of the second vertical shift registers, and cumulate the charges from the charge storage sections a plurality of times. The read circuit supplies a read signal at a predetermined timing to the charge storage section. The horizontal shift register receives a sum obtained by the charge adding media, and transfers the sum.

12 Claims, 8 Drawing Sheets

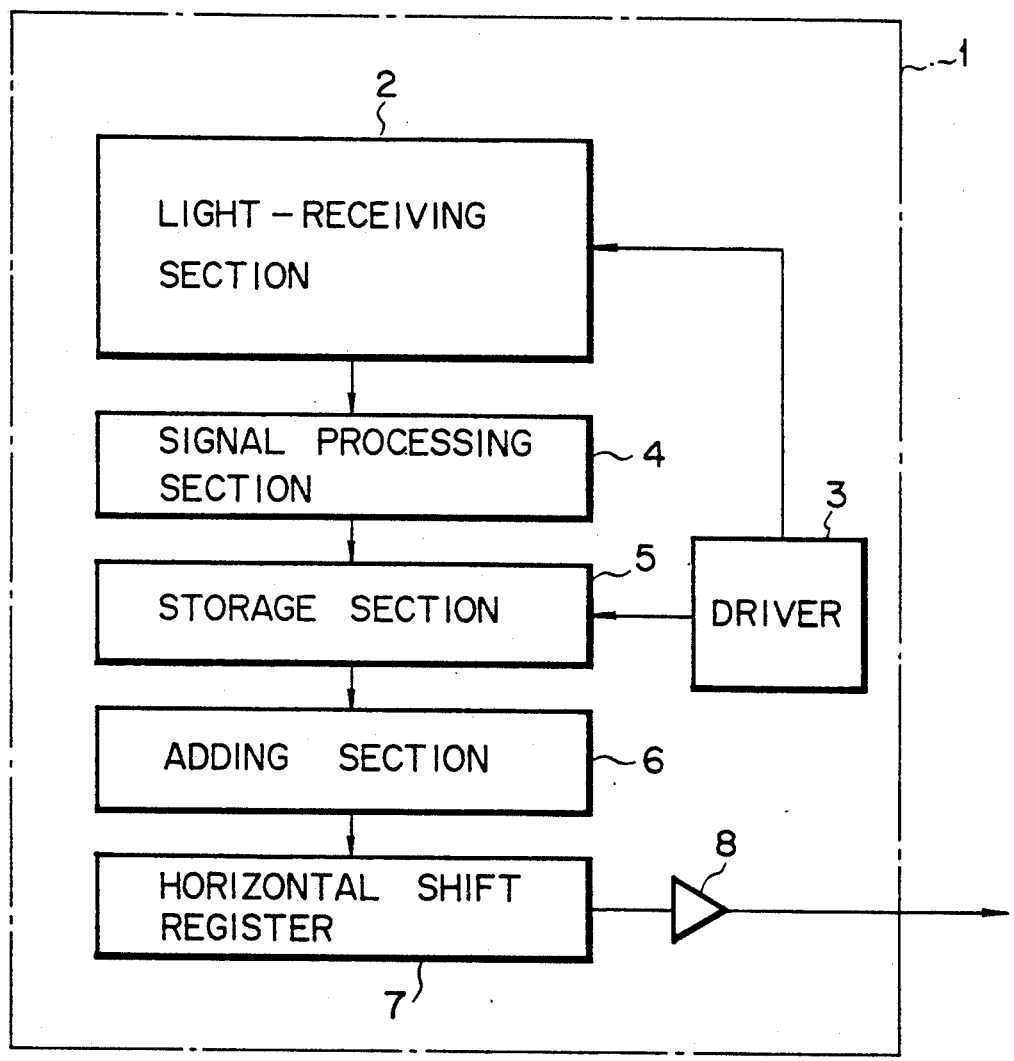
F I G. 1

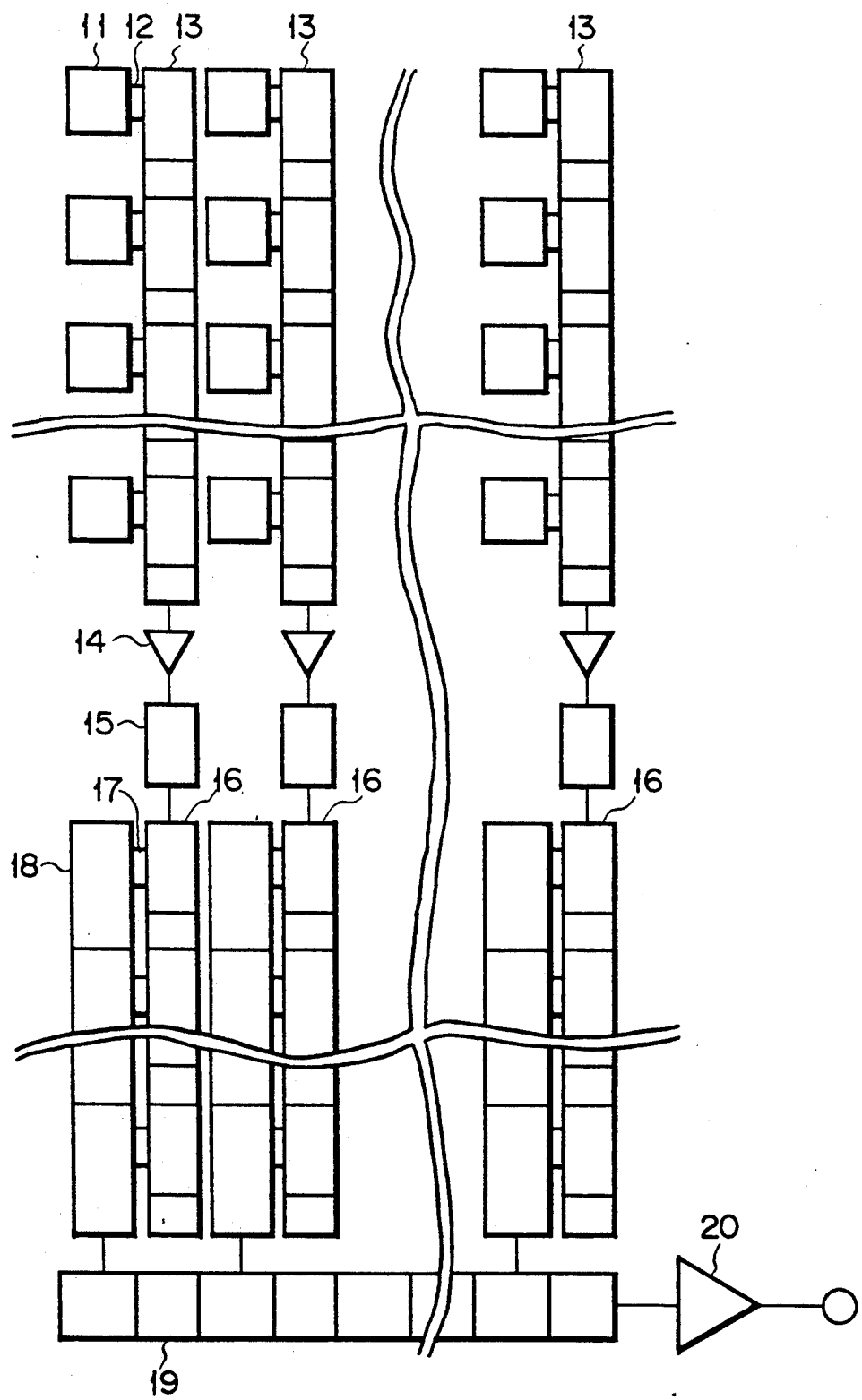
F I G. 2

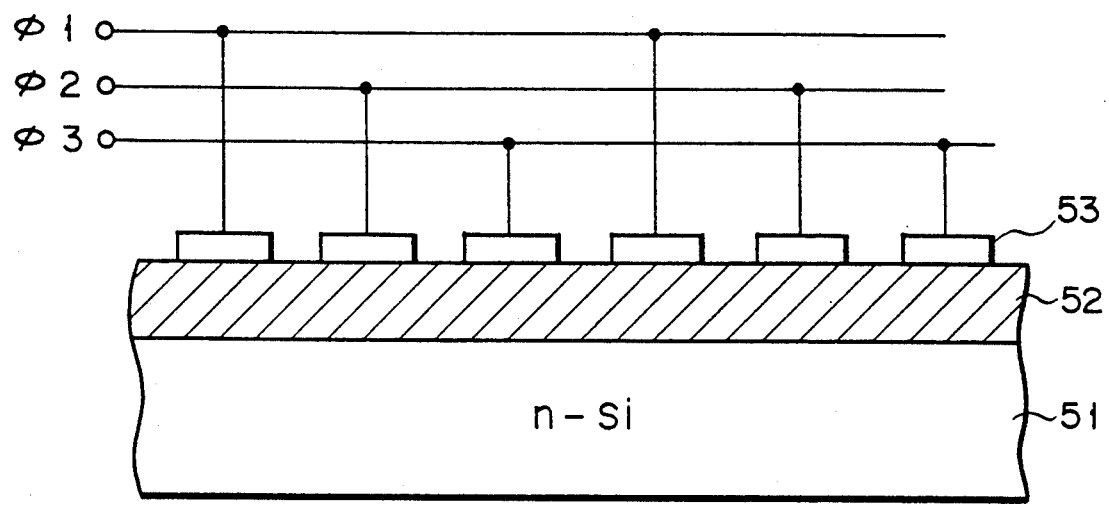
F I G. 13
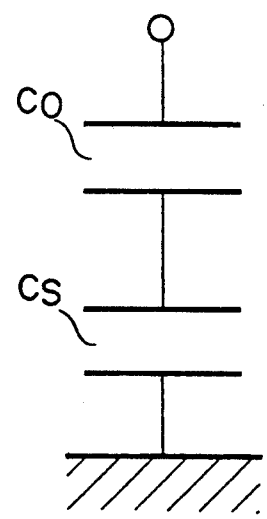
F I G. 14

SOLID-STATE IMAGING DEVICE HAVING A WIDENED DYNAMIC RANGE

BACKGROUND OF THE INVENTION

1. Field of the Invention

The present invention relates to a solid-state imaging device whose dynamic range can be widened.

2. Description of the Related Art

In general, an object which is to be converted into a video signal sometimes includes a luminance range wider than the dynamic range of a solid-state image pickup element. In such a case, the image of the object cannot be correctly reproduced. Therefore, the dynamic range of the solid-state image pickup element must be widened.

Japanese Patent Application No. 63-201406 discloses a device for widening the dynamic range of a solid-state image pickup element. According to this device, a plurality of images obtained by exposure for different exposure times are read from a nondestructive read-type image pickup element. The images are stored in a plurality of memories provided outside the image pickup element and are added to widen the dynamic range.

When this method is applied to an ordinary CCD, a time corresponding to several frames is required to obtain one frame image having a wide dynamic range. For example, when an image is picked up for 5 different exposure times, a time corresponding to 5 frames is required to obtain one frame image having a wide dynamic range, and it takes time to read the image from the image pickup element.

Methods for adding a plurality of images corresponding to different exposure times in accordance with an ordinary television rate have conventionally been provided including, e.g., a drive method proposed by Published Unexamined Japanese Patent Application No. 63-232591. According to this drive method, drive pulses of timings as shown in FIG. 11 are applied to a transfer gate for reading charges accumulated in an image pickup element. The image pickup element is reset by a pulse $\phi 0$, and exposure is performed for a time t1. Charges accumulated during this time are transferred to a vertical shift register in response to a pulse $\phi 1$.

Then, exposure is performed again for a time t2. Charges accumulated during this time are transferred to the vertical shift register in response to a pulse $\phi 2$, and the charges transferred in response to the pulses $\phi 1$ and $\phi 2$ are added. Thereafter, charges are transferred in the same manner. When the last charges are transferred in response to a pulse $\phi 5$ and are added by the vertical shift register, the sum is output to outside the element during a time t0.

However, non-uniform saturation can occur in a widely used image pickup element when the light-receiving section of the element is irradiated with light of an excessive light amount. As a result, a so-called fixed pattern noise component occurs and this noise component is included in the sum. The fixed pattern noise disables accurate reproduction of an object image.

More specifically, in the image pickup element, the charges accumulated in the light-receiving section are transferred to the vertical shift register through the transfer gate, as shown in FIG. 12. Charges saturated by an excessive light amount during an exposure time are discharged to a overflow drain. Adverse effects of saturated charges are thus prevented.

However, since the height of the overflow drain varies, an actual saturation value varies.

As a result, assume that the drive pulses shown in FIG. 11 are employed. When there is a pixel that saturates by an exposure for the times t1 to t3' the sum obtained by addition of the vertical shift register includes a fixed pattern noise component.

As described above, a conventional solid-state image pickup element adds read signal charges a plurality of times in units of pixels in order to widen the dynamic range. Thus, the adder, e.g., a vertical shift register needs a charge accumulator of a very large capacity which will not be saturated even after adding transferred charges a plurality of times.

As described above, however, since the adder must be incorporated in the image pickup element, it is considerably difficult to assign a large area to the charge accumulator to increase the capacity. Therefore, a large-capacity adder which will not be saturated even after performing addition a plurality of times has been desired.

SUMMARY OF THE INVENTION

It is a first object of the present invention to provide a solid-state imaging device which can realize high-speed data read, which can reliably prevent a fixed pattern noise component from being mixed in data which is read, and which can reproduce an image at a high precision.

It is a second object of the present invention to provide a solid-state imaging device which can incorporate in its element a large-capacity charge accumulator that will not be saturated even after adding charges read from a photoelectric conversion element a plurality of times, and which can reproduce an image at a high precision.

A solid-state imaging device according to the present invention comprises a plurality of photoelectric conversion elements, arranged in a matrix along a vertical direction and a horizontal direction, for generating charges in accordance with an irradiated light amount; a plurality of first vertical shift registers, electrically coupled to the plurality of photoelectric conversion element arranged in the vertical direction, for transferring, in the vertical direction, charges read from the photoelectric conversion element; a plurality of slice circuits, connected to output terminals of the plurality of first vertical shift registers, for removing excessive charges exceeding a preset slice level from the charges input from the plurality of first vertical shift registers connected thereto, and outputting effective charges; a plurality of second vertical shift registers, connected to output terminals of the plurality of slice circuits, having charge storage sections corresponding in number to the plurality of photoelectric conversion element connected to the first vertical shift registers, and for transferring in the vertical direction the effective charges output from the slice circuits connected thereto; a plurality of charge adding media, electrically coupled to the charge storage sections of the second vertical shift registers, for adding charges from corresponding ones of the photoelectric conversion element that are input from the charge storage sections a plurality of times; read circuits for supplying a read signal at a predetermined timing to the charge storage sections of the second vertical shift registers, and inputting the charges from the corresponding ones of the photoelectric conversion element to the charge adding media; and a horizontal shift register for receiving a sum obtained by adding the charges of the corresponding ones of said photoelectric conversion element by the plurality of charge adding media and transferring the sum in the horizontal direction.

According to the present invention, a fixed pattern noise component mixed in signal charges read from the photoelectric conversion element can be reliably removed, and an object image can be reproduced at a high precision. In addition, a large-capacity charge accumulator, which will not be saturated even after a plurality of times of addition of charges read from the photoelectric conversion element, can be incorporated in the image pickup element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of a solid-state image pickup device according to the first object of the present invention;

FIG. 2 shows the element arrangement of the first embodiment;

FIG. 13 is a sectional view of the element of a charge cumulating medium; and

FIG. 14 explains the capacitive characteristics of the charge cumulating medium shown in FIG. 13.

DETAILED DESCRIPTION OF THE PREFERRED EMBODIMENTS

Figure 3:
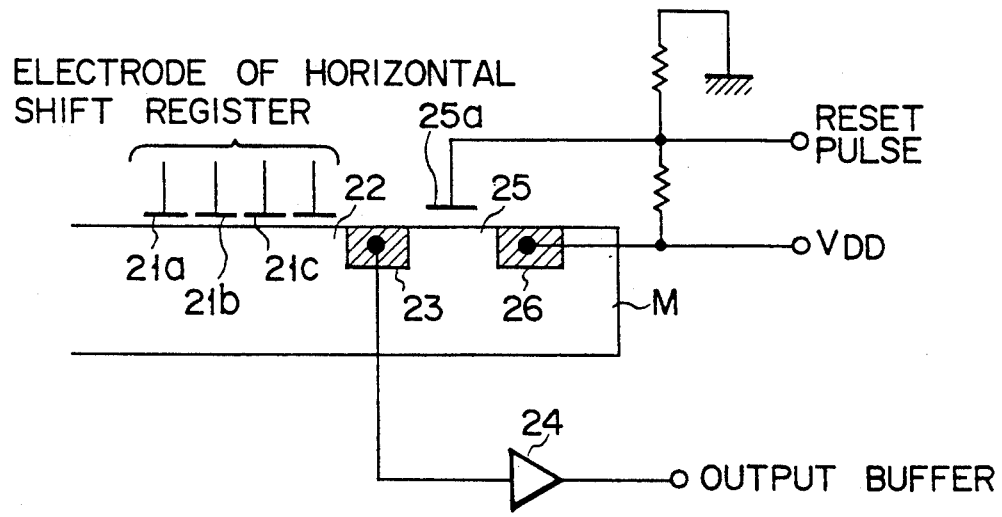
FIG. 3 shows the arrangement of a light-receiving section output buffer of the solid-state image pickup device according to the first embodiment of the present invention.

A preferred embodiment of the present invention will now be described.

In the preferred embodiment, the present invention is applied to a solid-state image pickup device having a frame interline transfer structure or a frame transfer structure.

FIG. 1 is a functional block diagram of a solid-state image pickup device according to the embodiment of the present invention.

A solid-state image pickup device 1 has, as major constituent elements, a light-receiving section 2, a driver 3, a signal processing circuit 4, a storage section 5, an adding section 6, a horizontal shift register 7, and an output buffer 8. The light-receiving section 2 accumulates charges in accordance with the irradiated light amount. The driver 3 reads the signal charges accumulated in the light-receiving section 2 at predetermined exposure times. A predetermined slice level for cutting excessive charges is set in the signal processing circuit 4. When the light-receiving section 2 is saturated, the signal processing circuit 4 removes a fixed pattern noise component mixed in the charges and outputs the effective charges. The storage section 5 sequentially stores outputs from the signal processing circuit 4. The adding section 6 adds the charges read from the storage section 5 at respective exposure times. The output buffer 8 outputs as a video signal charges transferred by the horizontal shift register 7.

FIG. 2 shows a practical arrangement of this embodiment. The light-receiving section comprises a plurality of photosensors 11, a plurality of transfer gates 12, and a plurality of first vertical shift registers 13. The photosensors 11 are arranged in a matrix. The transfer gates 12 are respectively provided to the photosensors 11 and receive reading drive pulses. The first vertical shift registers 13 are provided along the respective transfer gates 12 of the photosensors 11 arranged in the vertical direction and transfer the charges read from the photosensors 11.

One end of each vertical shift register 13 is connected to a corresponding slice circuit 15 via a light-receiving section output buffer 14 comprising a floating diffusion amplifier. The output terminal of each slice circuit 15 is connected to one end of a corresponding second vertical shift register 16. Each second vertical shift register 16 consists of a plurality of registers for temporarily storing in units of pixels charges read from each photosensor 11. Each register 16 is connected to an addition register 18 via a transfer gate 17. The addition register 18 sequentially adds the charges read from the respective registers of each second vertical shift register 16 a plurality of times. One end of each addition register 18 is connected to a horizontal shift register 19. Charges transferred by the horizontal shift register 19 are output from an output buffer 20.

The light-receiving section output buffer 14 has an arrangement as shown in FIG. 3. A horizontal shift register electrode 21 is provided on a substrate M, and the output side of the vertical shift register 13 is electrically coupled to an input electrode 21a of the electrode 21. A floating diffusion region 23 is formed for an output electrode 21c of the horizontal shift register 21 via an output gate 22. The floating diffusion region 23 is connected to an output buffer 24 via a reset gate 25. The reset gate 25 is formed adjacent to the floating diffusion region 23, and a charge sweep drain 26 is formed via the reset gate 25. A reset pulse is applied to the reset gate 25 from a gate electrode 25a.

Figure 4:
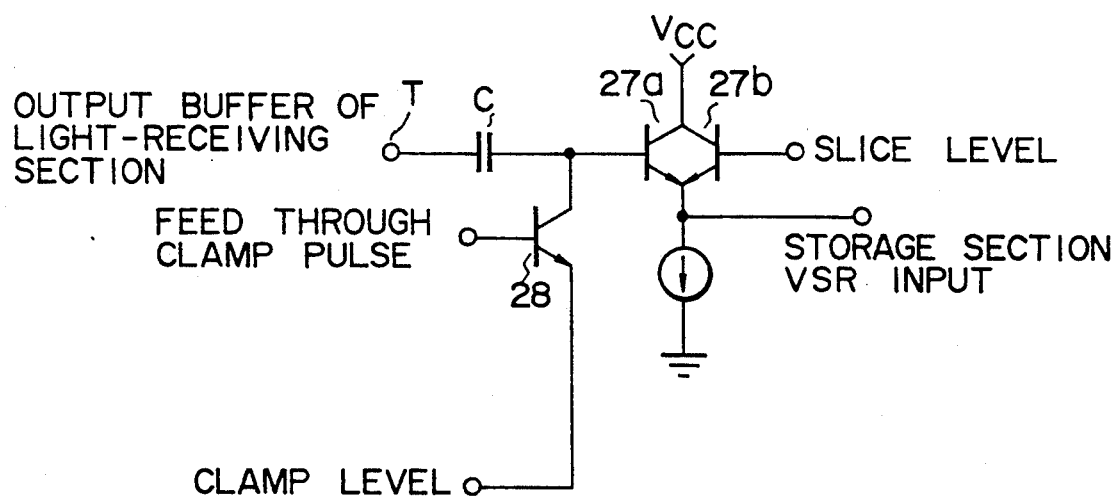
FIG. 4 shows the signal processing section of the solid-state image pickup device according to the first embodiment of the present invention.

The slice circuit 15 has an arrangement as shown in FIG. 4. In this slice circuit 15, an output from the output buffer 24 is applied to its input terminal T. The input terminal T is connected to one base of a slice transistor 27 through a clamp capacitor C. The slice transistor 27 comprises two transistors 27a and 27b whose collectors are connected to their emitters. A slice level voltage that serves as a threshold voltage to cut excessive charges is applied to the other base of the slice transistor 27. A potential appearing at the emitter of the slice transistor 27 is output to the second vertical shift register 16.

Figure 5:
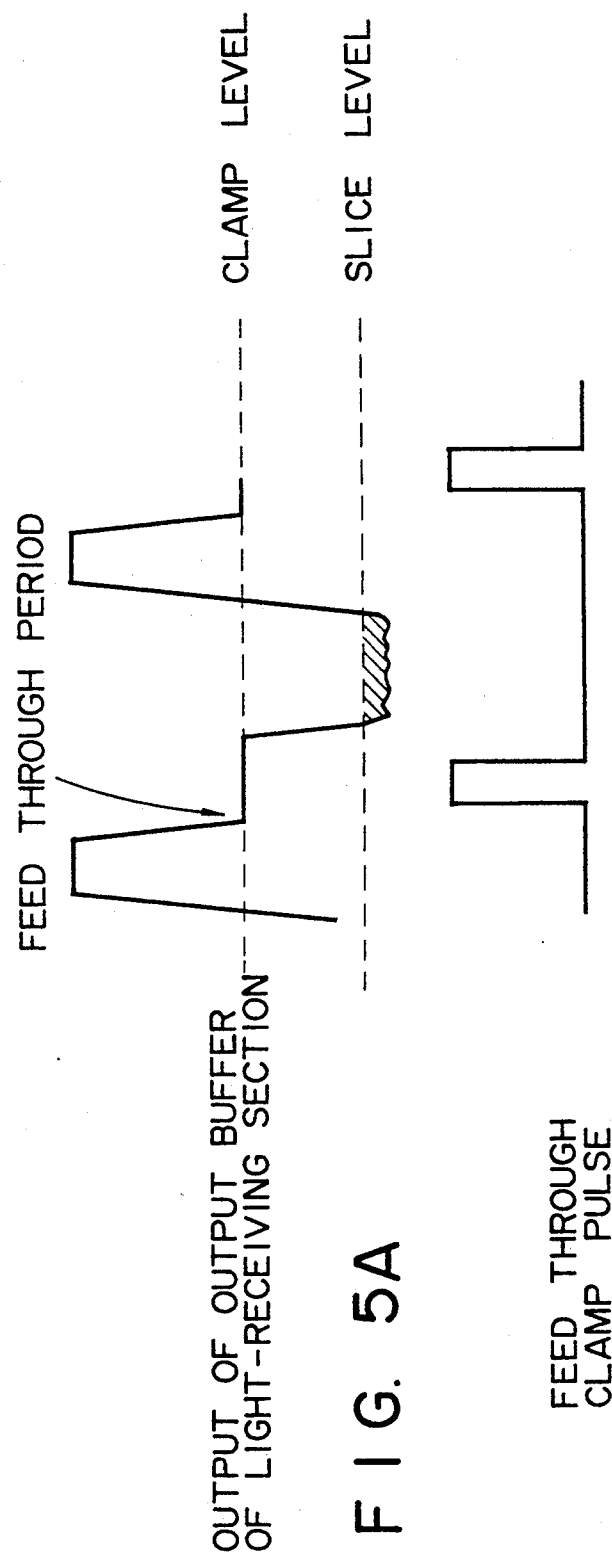
FIG. 5A is a chart showing the signal level of the output buffer shown in FIG. 4.
FIG. 5B is a chart showing the feed through clamp pulse of FIG. 4.

The slice circuit 15 sets the clamp level as well. For this purpose, in response to the signal charges shown in FIG. 5A, a feed through clamp pulse shown in FIG. 5B is applied to the base of a clamp transistor 28, a clamp level voltage is applied to its emitter, and its collector is connected to the base of the slice transistor 27a. The clamp level is set more effectively, and is particularly needed, when a DC voltage stability of the base potential of the slice transistor 27 is low. On the other hand, when such DC voltage stability is high, clamp transistor 28 can be omitted.

The addition register 18 has a sufficient capacity for accumulating charges sequentially read for different exposure times. The area of the addition register 18 is set larger than that of the second vertical shift register 16, and its application voltage is also set high. The silicon substrate of the addition register 18 has a high impurity concentration in order to increase the capacity of the addition register 18.

The operation of this embodiment having the above arrangement will be described.

Figure 6:
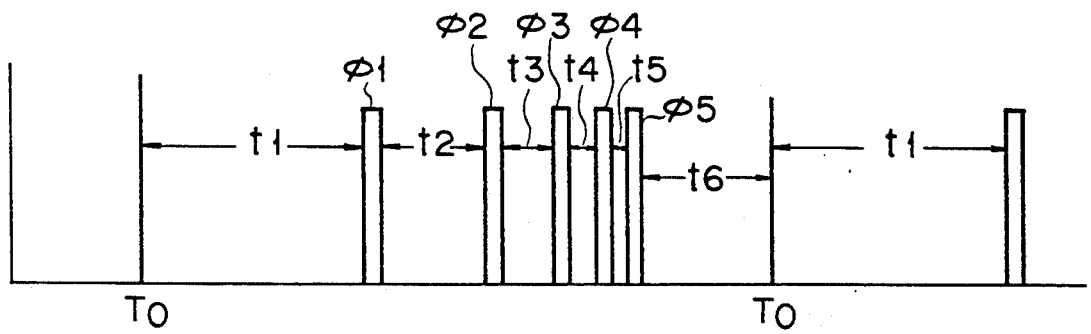
FIG. 6 is a chart showing drive pulses applied to the accumulator transfer gate of the solid-state image pickup device according to the first embodiment of the present invention.

Drive pulses $\phi1$ to $\phi5$ are applied to the transfer gate 12 of each of a plurality of photosensors 11 arranged in a matrix at timings shown in FIG. 6. Reference symbol T0 of FIG. 6 indicates an exposure start time. More specifically, the photosensors 11 are exposed for exposure times t1 to t5. The charges accumulated in the photosensors 11 during each exposure are sequentially read to the first vertical shift registers 13 by applying the drive pulses $\phi1$ to $\phi5$ to the corresponding transfer gates 12.

The first vertical shift registers 13 transfer, at a predetermined transfer period, charges input from the corresponding photosensors 11, and the charges are then input to the light-receiving section output buffers 14.

The charges input to the light-receiving section output buffers 14 are transferred from the input electrode 21a to the output electrode 21c of the horizontal shift register electrode 21 at the transfer periods, and are supplied to the floating diffusion 23 via the output gate 22. The potential of the floating diffusion 23 is detected by the output buffer 24, and amplified signal charges are input to the slice circuit 15.

A reset pulse is applied to the reset gate 25 in synchronism with the transfer period, so that the floating diffusion 23 is reset at the same potential as that of the sweep drain 26.

In the slice circuit 15, the feed through clamp pulse shown in FIG. 5B is applied to the base of the clamp transistor 28 to match the feed through interval of the input signal. As a result, the feed through level is clamped at the clamp level set by the clamp transistor 28.

This clamp is performed every time the feed through level appears. The signal charges clamped in this manner are sliced at the slice level by the slice transistor 27 so that the excessive charges are cut as shown by a hatched portion in FIG. 5A. The signal charges, from which the excessive charges are cut, are input to the second vertical shift register 16.

When all the signal charges of the same exposure time are transferred to the second vertical shift resisters 16, the drive pulses are applied to the transfer gates 17, and the signal charges accumulated in the respective registers of the second vertical shift registers 16 are transferred to the registers of the addition registers 18 coupled thereto.

In this embodiment, the drive pulses shown in FIG. 6 are applied to the transfer gates 17 as well. The drive pulses $\phi1$ to $\phi5$ are drive pulses for transferring the charges of the second vertical shift registers 16 to the addition registers 18.

The signal charges sequentially transferred to the registers of the second vertical shift registers 16 are read in response to the pulses $\phi1$ to $\phi5$, and five images of different exposure times are transferred to the registers of the addition registers 18 in units of pixels (photosensors) and are added.

After a plurality of images are read by application of the drive pulses $\phi1$ to $\phi5$, the charges are transferred from the addition registers 18 to the horizontal shift register 19 during the time t0, and then to outside the element via the output buffer 20.

Charge transfer to the horizontal shift register 19 is performed by the addition registers 18. The charges transferred by the horizontal shift register 19 are output as a video signal via the output buffer 20.

Figure 7:
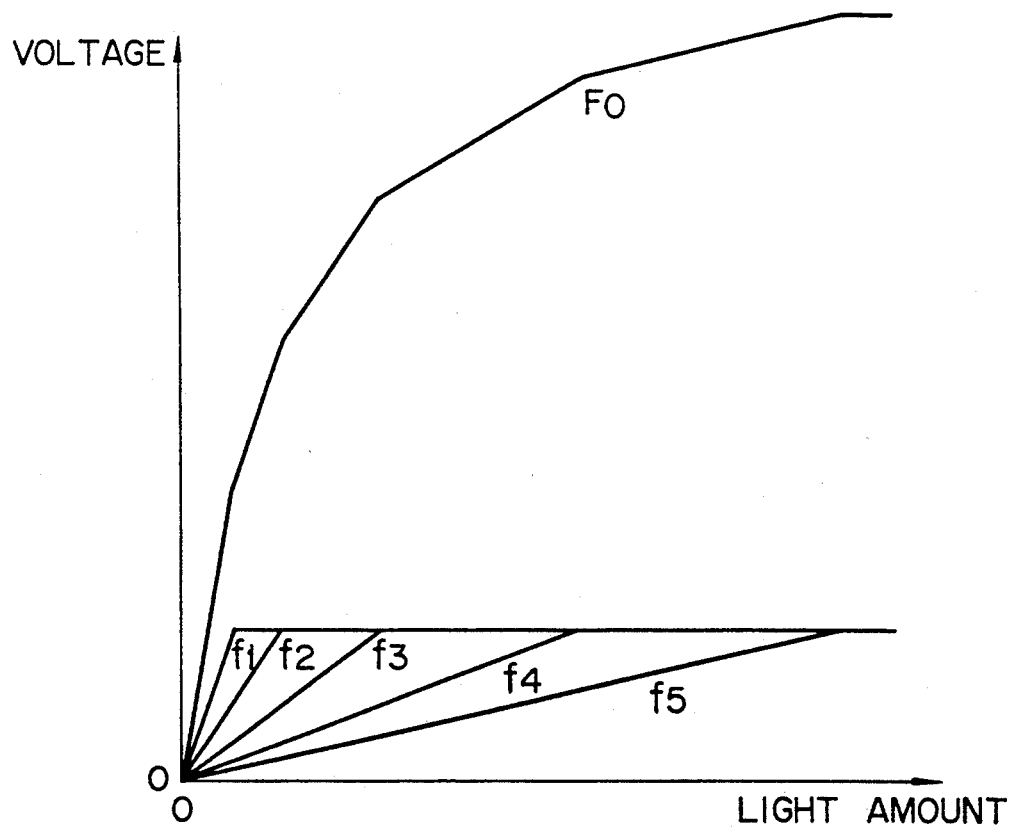
FIG. 7 is a graph of characteristics of photoelectric conversion performed in response to the drive pulses.

The photoelectric conversion characteristics obtained by this operation will be described with reference to FIG. 7. Reference symbols f1 to f5 denote photoelectric conversion curves corresponding to the respective exposure times t1 to t5. This indicates that the charges obtained during the respective exposure times t1 to t5 are added by the registers of the addition registers 18 in units of pixels and are converted to become a photoelectric conversion curve F0. The curve F0 can have a waveform approximating a logarithmic or square root curve.

In the above operation, a plurality of images obtained by changing the exposure times are added. However, addition can be performed while the exposure times are kept constant. Namely, when a plurality of images obtained during fixed exposure times are added, the addition becomes cumulation, and the random noise can be decreased, thus widening the dynamic range.

For example, when cumulation is performed four times, the dynamic range can be widened by $\sqrt{4}=2$ times. With this drive method, although the wide dynamic range effect is not very good, the photoelectric conversion curve becomes linear, and the processing circuit after the output stage of the solid-state image pickup device 1 can be simplified.

In this manner, according to this embodiment, the charges read from the plurality of photosensors 11 are input to the slice circuits 15 to set the clamp level. Simultaneously, the excessive charges are sliced by the slice transistors 27 at the slice level. As a result, excessive charges included in the signal charges read from the photosensors 11 can be cut, and fixed pattern noise mixed in the signal charges read from the respective photosensors 11 can be removed.

Since noise components are cut in this manner and a plurality of charges obtained for different exposure times are added by the addition registers 18 in units of pixels, the dynamic range can be widened.

As a result, a video signal not including a noise component and having a wide dynamic range can be obtained, a considerably high-precision image can be obtained without being influenced by the brightness of the object, and an image with a wide dynamic range can be obtained even with an ordinary television rate.

Since a plurality of images are added by the addition registers 18 provided in the image pickup element, the read time can be greatly reduced compared to a case in which addition is performed after a plurality of images are fed outside the element.

A modification of the light-receiving section output buffer 14 of the above embodiment will be described.

In the first embodiment, the light-receiving section output buffer 14 uses a floating diffusion amplifier. However, a single potential well can be used as the floating diffusion amplifier.

Figure 8:
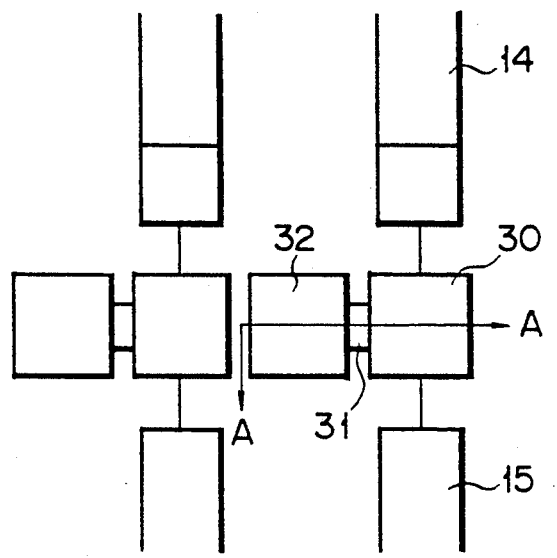
FIG. 8 shows a modification of the light-receiving section output buffer.

FIG. 8 shows a light-receiving section output buffer 14 comprising a single potential well, and a slice circuit 15 corresponding to it.

According to this modification, a floating drain 30 is provided between each light-receiving section output buffer 14 and each slice circuit 15. The floating drain 30 is connected to a sweep drain 32 through a sweep transfer gate 31.

Figure 9:
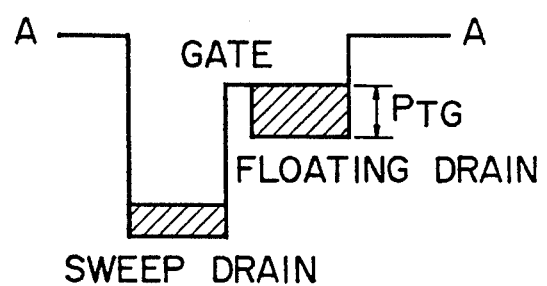
FIG. 9 is a sectional view taken along the line A—A of FIG. 8.

FIG. 9 is a sectional view taken along the line A—A of FIG. 8 to show the potential state of the light-receiving section output buffer 14. The image pickup element is fabricated such that a depth $P_{TG}$ of the potential well is the same in units of columns.

With this arrangement, the slice circuit for slicing excessive charges can be made with a high density, resulting in size reduction of the element.

The light-receiving section output buffer 14 can be modified in the following manner as well. Namely, a floating gate amplifier is used as the light-receiving section output buffer 14.

A floating gate amplifier has a good DC voltage stability and less noise. Hence, the clamp circuit (28) of the slice circuit 15 shown in FIG. 4 can be omitted.

Figure 10:
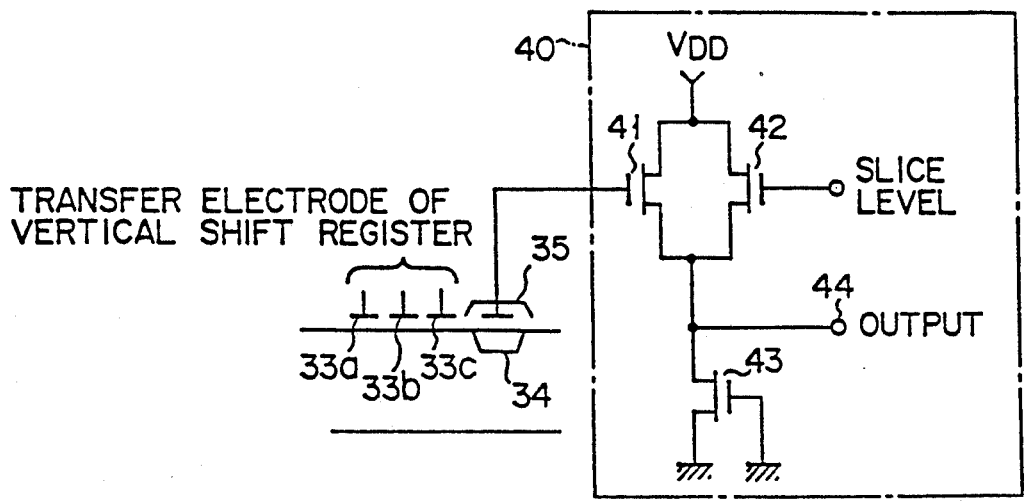
FIG. 10 shows a modification of the light-receiving section output buffer and a slice circuit.
Figure 11:
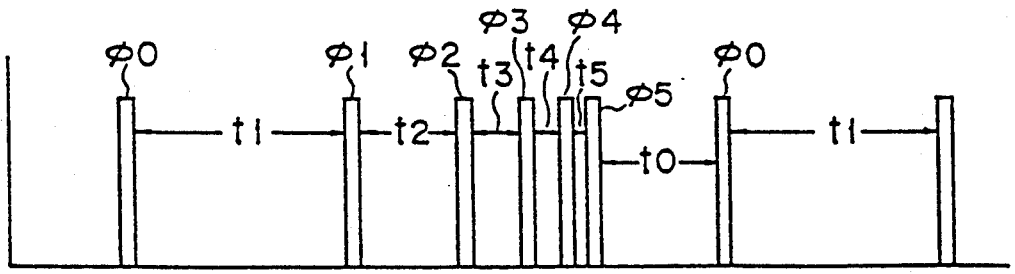
FIG. 11 is a chart showing drive pulses used in a conventional image pickup device.
Figure 12:
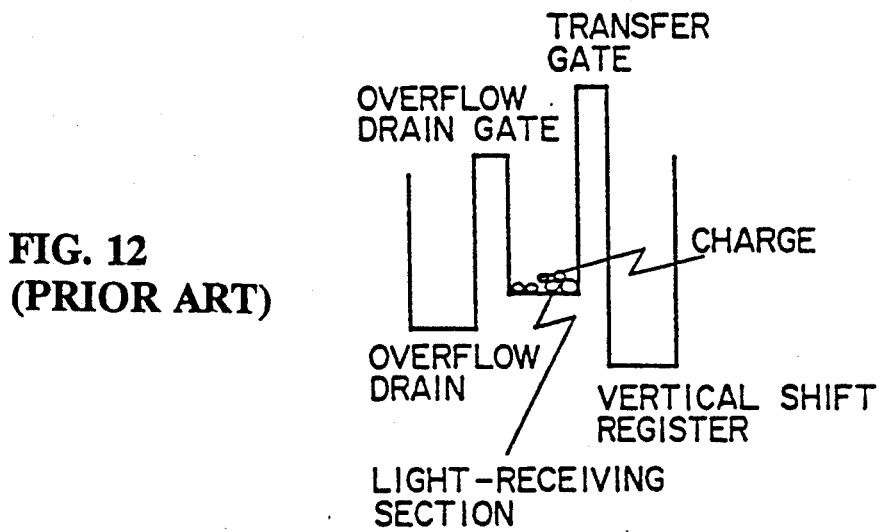
FIG. 12 shows the potential of an image pickup element.

Therefore, when the floating gate amplifier is used, the slice circuit 15 can comprise only a slice circuit 40, as shown in FIG. 10.

In the circuit shown in FIG. 10, charges applied to a transfer electrode 33 in the light-receiving section output buffer 14 are transferred from a transfer electrode 33a to a transfer electrode 33c and are guided to a floating gate 34. A DC bias voltage is applied to the floating gate 34 from an electrode 35. The electrode 35 is connected to the slice circuit 40.

The slice circuit 40 comprises three field-effect transistors 41, 42, and 43. The source and drain of the transistor 41 are connected to those of the transistor 42. The gate of the transistor 41 is connected to the electrode 35, and a slice level voltage is applied to the gate of the transistor 42. A power source $V_{DD}$ is applied to the common node of the drains of the transistors 41 and 42, and the common node of the sources thereof is connected to an output terminal 44 and another transistor 43 constituting a constant current source.

Bipolar transistors can be used in place of the field-effect transistors. However, since the CCD itself uses a field-effect transistor, it is more advantageous to use field-effect transistors to constitute the slice circuit 40 in view of simplification of the manufacturing steps.

In the above description, the slice level is constant. However, the slice level can be changed in accordance with the exposure times. In this manner, the degree of flexibility of the characteristic F0 shown in FIG. 6 can be increased. Hence, when the driver is to be simplified, it is preferable to fix the slice level; when the degree of flexibility of the function F0 is to be increased, it is preferable to vary the slice level.

The second embodiment of the present invention will be described.

A solid-state image pickup device according to the second embodiment have the same arrangement as that shown in FIG. 2. Namely, the basic arrangement is the same as the first embodiment described above. The characteristic feature of the second embodiment resides in that the addition register has an arrangement as shown in FIG. 13 in order to increase its capacity.

More specifically, an addition register 50 used in this embodiment has the following structure. A ferroelectric layer 52 is formed on an n-type silicon substrate 51, and a plurality of polysilicon electrodes 53 are formed on the ferroelectric layer 52 along the charge transfer direction. In the case of FIG. 13, the CCD is a three-phase CCD. The first and fourth electrodes, the second and fifth electrodes, and the third and sixth electrodes from the left in the drawing are connected to each other in order to apply the same voltage by an output means to every third poles. Transfer pulses $\phi 1$ to $\phi 3$ are applied by the output means in units of electrode pairs.

When a ferromagnetic material is used as the oxide film layer 52 formed on the silicon substrate, the charge storage amount is increased. This basic idea will be described.

The following equation is satisfied:

$$Q = CV \quad (1)$$

where Q is the charge amount, C is the capacitance, and V is the application voltage. This indicates as the capacitance C and the application voltage are increased, the charge storage amount is increased. This will be described with reference to the case of a three-phase CCD. An addition register has the same arrangement as in FIG. 13. The equivalent circuit of the addition register is shown in FIG. 14. Referring to FIG. 14, reference symbol Co denotes the capacitance per unit area of the silicon oxide film layer 52 formed on the n-type silicon substrate 51; and Cs, the capacitance per unit area of the depletion layer in the n-type silicon substrate 51. The voltage applied to the polysilicon electrode 53 is controlled to transfer charges to the layer 52 and the substrate 51. The capacitance C in this case is represented by the following equation:

$$C = Co \cdot Cs/(Co + Cs) \quad (2)$$

Co and Cs are given by the following equations:

$$Co = (Ko \cdot \epsilon o)/Xo \quad (3)$$

$$Cs = (Ks \cdot \epsilon o)/Xd \quad (4)$$

where Ko is the dielectric constant of silicon oxide, Ks is the dielectric constant of n-type silicon, $\epsilon o$ is the dielectric constant in vacuum, Xo is the thickness of silicon oxide, and Xd is the thickness of the n-type silicon depletion layer.

It is apparent from equation (1) that the value of C and the application voltage may be increased in order to increase the transfer charges. In order to increase the capacitance C, Co and Cs may be increased. Xd is known to satisfy the following equation:

$$Xd = (Ks\epsilon o/Co) + (Ks\epsilon o/Co) + \tag{5}$$
$$(Ks\epsilon o/Co)\{1 + 2\ V_G Co^2/qNaKs\epsilon o)\}^{\frac{1}{2}}$$

where $V_G$ is the gate voltage, q is the electron charge amount, and Na is the impurity concentration in n-type silicon. It is clear that Co and Na may be increased in order to decrease Xd. Hence, in order to increase the capacitance C of equation (1), it is most effective to increase Co.

The ferroelectric layer 52 is constituted by dielectric material of which the dielectric constant is several to several hundred times that of the silicon oxide film. For example, when a material having a dielectric constant fifty times that of the silicon oxide film is selected, Co of FIG. 14 becomes fifty times. Cs can be developed as follows from equations (4) and (5):

$$Cs = 1/(A + \sqrt{A^2 + B}) \tag{6}$$

where $A = 1/Co$ and $B = 2V_G/(qKs\cdot\epsilon o\cdot Na)$

In equation (6), since A is the function of Co, when Co is multiplied by 50, A is decreased to a value 1/50 the original value. However, since B does not include Co as a parameter, B does not change even when Co is changed. Thus, although Cs is increased as Co is increased, it does not increase as much as Co does. In order to decrease B, it is effective to increase the impurity concentration Na and use a semiconductor having a large dielectric constant Ks. Examples of a semiconductor having a dielectric constant higher than that of silicon include InAs and InP. When the impurity concentration Na and the dielectric constant Ks are adjusted for optimization, B can be decreased. In short, when the three parameters: the capacitance Co, the impurity concentration Na, and the dielectric constant Ks are increased, Cs can be increased.

Because of this, in this embodiment, the ferroelectric layer 52 is arranged on the silicon substrate 51 having a high impurity concentration Na.

The operation of the addition register 50 will be described in more detail.

For example, when the potential level of the first phase $\phi 1$ shown in FIG. 13 is decreased, charges are transferred from the second vertical shift register 16 to a portion of the layer 52 under the electrode of the first phase $\phi 1$. When exposure and charge transfer to the addition register 50 are repeated, charges are sequentially added and accumulated at the portion under the electrode of the first phase $\phi 1$ in units of pixels.

Subsequently, when the potential level of the second phase $\phi 2$ is decreased and simultaneously the potential level of the first phase $\phi 1$ is increased, the charges (sum) under the electrode of the phase $\phi 1$ are transferred to a portion under the electrode of the phase $\phi 2$, and the charges are sequentially transferred from the left to right in the drawing to reach the horizontal shift register 19.

When the charges are guided to the horizontal shift register 19, they are output from the output buffer 20 as a video signal.

In this manner, according to the second embodiment, the ferroelectric layer 52 is arranged on the n-type silicon substrate 51 having the high impurity concentration Na, and the plurality of polysilicon electrodes 53 are formed on the ferroelectric layer 52 to constitute the addition register 50. As a result, the large-capacity addition register 50 is realized within the element, so that charge saturation can be reliably prevented. Thus, the dynamic range can be widened without causing degradation in the image due to saturation, and the image can be reproduced at a high precision.

In addition, a plurality of images are added by the addition register 50 provided in the element. Therefore, compared to a case where addition is performed after a plurality of images are externally extracted from the element, the read time can be greatly reduced.

What is claimed is:

1. A solid-state imaging device comprising:
    a plurality of photoelectric conversion elements, arranged in a matrix of horizontally, sequentially spaced sets with each set including a plurality of vertical photoelectric conversion elements arranged vertical direction, for generating charges in accordance with an irradiated light amount;
    a plurality of first vertical shift registers, each of which is electrically coupled to said plurality of vertical photoelectric conversion elements in one of said sets, for transferring, in the vertical direction, the charges read from the vertical photoelectric conversion elements;
    a plurality of slice means, respectively connected to output terminals of said plurality of first vertical shift registers, for removing excessive charges exceeding a present slice level from the charges input from said first vertical shift registers, and outputting effective charges;
    a plurality of second vertical shift registers, respectively connected to output terminals of said plurality of slice means, with each of said second vertical shift registers having a plurality of charge storage sections corresponding in number to said plurality of vertical photoelectric conversion elements in each of said sets, and for transferring in the vertical direction the effective charges output from said slice means;
    a plurality of charge adding means, electrically coupled, respectively, to said charge storage sections of said plurality of second vertical shift registers, each of said plurality of charge adding means adding the effective charges which are input from each of said charge storage sections a plurality of times, and which correspond to those outputted from a corresponding one of said plurality of photoelectric conversion elements to output added effective charges;
    read out means for reading out the effective charges from said second vertical shift registers to said charge adding means; and
    a horizontal shift register for receiving the added effective charges outputted from said charge adding means and transferring the added effective charges in the horizontal direction to form an image signal.

2. A device according to claim 1, further comprising a floating diffusion amplifier receiving the charges from said plurality of first vertical shift registers in one of said sets, and having a transfer electrode means for transferring the charges received from said plurality of first vertical shift resisters in a predetermined direction, an output gate formed on one end of said transfer electrode means, a floating diffusion region to which the charges transferred by said transfer electrode are supplied through said output gate, a reset gate formed adjacent to said floating diffusion region, a drain to which the charges in said floating diffusion means are supplied through said reset gate when said floating diffusion region is reset, and an output buffer for detecting a potential of said floating diffusion region and amplifying the detected potential to output amplified signal charges to one of said plurality of slice means.

3. A device according to claim 2, wherein said plurality of slice means each include a slice circuit which has two transistors whose collectors are connected to each other and whose emitters are connected to each other, a base of one of said two transistors is connected to an output terminal of the plurality of first vertical shift registers, a slice level potential is applied to a base of the other of said two transistors, a constant voltage is applied to said collectors, and said emitters are connected to said corresponding one of said plurality of second vertical shift registers.

4. A device according to claim 3, wherein said plurality of slice means each further comprises a clamp circuit for setting a base potential of one of said two transistors at a clamp level when the DC voltage stability of said base potential is low.

5. A device according to claim 2, wherein said plurality of slice means each include a slice circuit, which has two field-effect transistors whose sources are connected to each other and whose drains are connected to each other, an output from said floating diffusion amplifier is applied to a gate of one of said two field-effect transistors, a constant voltage is applied to said drains, and said sources are connected to one of said plurality of second vertical shift registers.

6. A device according to claim 1, further comprising a floating gate amplifier for amplifying the charges output from said plurality of first vertical shift in one of said sets registers.

7. A device according to claim 6, wherein said plurality of slice means each include a slice circuit, which has two field-effect transistors whose sources are connected to each other and whose drains are connected to each other, an output from said floating gate amplifier is applied to a gate of one of said two field-effect transistors, a constant voltage is applied to said drains, and said sources are connected to one of said plurality second vertical shift registers.

8. A device according to claim 6, wherein said plurality of slice means each include a slice circuit which has two transistors whose collectors are connected to each other and whose emitters are connected to each other, a base of one of said two transistors is connected to an output terminal of the corresponding floating gate plurality of first vertical shift registers, a slice level potential is applied to a base of the other of said two transistors, a constant voltage is applied to said collectors, and said emitters are connected to said plurality of corresponding one of said second vertical shift registers.

9. A device according to claim 8, wherein said plurality of slice means each further comprises a clamp circuit for setting a base potential of one of said two transistors at a clamp level when the DC voltage stability of said base potential is low.

10. A device according to claim 1, wherein said charge adding means comprises a charge accumulator formed of a ferroelectric material.

11. A device according to claim 1, wherein said charge adding means comprises a semiconductor substrate, a first layer formed of a ferroelectric material and formed on said semiconductor substrate, and an electrode formed on said first layer.

12. A device according to claim 1, further comprising:
means for exposing said plurality of photoelectric conversion elements for a plurality of different exposure times, and
means for reading the charges, accumulated in said photoelectric conversion elements during the exposure times, upon each exposure.

* * * * *

UNITED STATES PATENT AND TRADEMARK OFFICE
CERTIFICATE OF CORRECTION

PATENT NO. : 5,166,800
DATED : November 24, 1992
INVENTOR(S) : MORI et al.

It is certified that error appears in the above-indentified patent and that said Letters Patent is hereby corrected as shown below:

Title page, Item [56] References Cited, under "FOREIGN PATENT DOCUMENTS", insert the following:

--63-232591 (A)  9/1988  Japan--.

Signed and Sealed this

Twenty-ninth Day of April, 1997

Attest:

BRUCE LEHMAN

*Attesting Officer*      Commissioner of Patents and Trademarks